(12) United States Patent
Reddy et al.

(10) Patent No.: US 9,249,492 B2
(45) Date of Patent: Feb. 2, 2016

(54) MATERIALS HAVING AN ENHANCED EMISSIVITY AND METHODS FOR MAKING THE SAME

(75) Inventors: Ganta S. Reddy, Cincinnati, OH (US); Jainagesh Sekhar, Cincinnati, OH (US)

(73) Assignee: Micropyretics Heaters International, Inc., Cincinnati, OH (US)

( * ) Notice: Subject to any disclaimer, the term of this patent is extended or adjusted under 35 U.S.C. 154(b) by 1421 days.

(21) Appl. No.: 12/092,923

(22) PCT Filed: Nov. 7, 2006

(86) PCT No.: PCT/US2006/060621
§ 371 (c)(1),
(2), (4) Date: Sep. 9, 2008

(87) PCT Pub. No.: WO2007/114852
PCT Pub. Date: Oct. 11, 2007

(65) Prior Publication Data
US 2009/0004456 A1  Jan. 1, 2009

Related U.S. Application Data

(60) Provisional application No. 60/733,808, filed on Nov. 7, 2005.

(51) Int. Cl.
| | |
|---|---|
| C23C 4/10 | (2006.01) |
| C23C 4/12 | (2006.01) |
| C08J 9/24 | (2006.01) |
| B22F 1/00 | (2006.01) |
| B32B 7/04 | (2006.01) |

(52) U.S. Cl.
CPC ............ *C23C 4/125* (2013.01); *B22F 1/0018* (2013.01); *B32B 7/04* (2013.01); *C08J 9/24* (2013.01); *C23C 4/10* (2013.01); *Y10T 428/249953* (2015.04)

(58) Field of Classification Search
CPC .......... B22F 2304/05; B22F 2304/052; B22F 2304/054; B22F 2304/056; B22F 2304/058; B22F 2007/045; B22F 7/04; B22F 1/0018; B22F 1/02; B32B 2310/14; B32B 7/04; B32B 7/06; B32B 5/16; C23C 4/00; C23C 4/10; C23C 4/125; C23C 4/127; C23C 4/06; C23C 4/12; C23C 18/127; Y10S 428/939; B23K 2201/34; C22C 29/00; C08J 9/24
USPC .......... 428/304.4, 312.2, 550, 552, 566, 698, 428/331, 143–145, 557, 560, 570, 613, 428/323; 501/88–92; 219/76.13, 76.1, 219/137.2, 121.11, 136; 419/2, 10, 14, 12, 419/13, 35; 313/310, 346 R; 977/773, 977/775–777; 162/207; 427/375; 34/519
See application file for complete search history.

(56) References Cited

U.S. PATENT DOCUMENTS

| | | | | |
|---|---|---|---|---|
| 2,755,199 | A * | 7/1956 | Rossheim et al. | 427/180 |
| 3,356,912 | A * | 12/1967 | Rairden, III et al. | 361/529 |
| 3,666,906 | A | 5/1972 | Byrne | |
| 4,293,619 | A * | 10/1981 | Landingham et al. | 428/623 |
| 4,377,618 | A * | 3/1983 | Ikeda et al. | 428/323 |
| 4,789,385 | A * | 12/1988 | Dyer et al. | 51/293 |
| 4,824,730 | A * | 4/1989 | Fukuda et al. | 428/447 |
| 5,062,146 | A * | 10/1991 | Kagechika | 392/432 |
| 5,296,288 | A * | 3/1994 | Kourtides et al. | 428/331 |
| 5,344,727 | A * | 9/1994 | Meadows et al. | 429/210 |
| 5,439,736 | A | 8/1995 | Nomura | |
| 5,472,487 | A * | 12/1995 | Chin et al. | 428/552 |
| 5,492,769 | A * | 2/1996 | Pryor et al. | 428/552 |
| 5,590,383 | A * | 12/1996 | Sekhar et al. | 419/2 |
| 6,218,318 | B1 * | 4/2001 | Ohkura et al. | 438/782 |
| 6,561,794 | B1 * | 5/2003 | Narasimhan | 431/328 |
| 6,749,942 | B1 * | 6/2004 | Wittenauer et al. | 428/446 |
| 6,767,659 | B1 * | 7/2004 | Campbell | 428/701 |

(Continued)

FOREIGN PATENT DOCUMENTS

| | | |
|---|---|---|
| EP | 1255272 A2 | 11/2002 |
| FR | 2698885 A1 * | 6/1994 |

(Continued)

OTHER PUBLICATIONS

347 Stainless Steel Data Sheet, found at <http://www.matweb.com>.*
Lee W. Young; International Search Report for related international application PCT/US06/60621; dated as mailed Oct. 16, 2007; 3 pages; USPTO.
Marianna Oliveras; Supplementary European Search Report for European Patent Application 06850114.7-1215 / 1951924; dated as mailed Dec. 7, 2010; 5 pages EPO.

*Primary Examiner* — David Sample
*Assistant Examiner* — Nicholas W Jordan
(74) *Attorney, Agent, or Firm* — Michael C. Connelly

(57) ABSTRACT

Exemplary materials exhibiting high emissivity and methods for making them are provided. These materials can include a porous coating of small particles provided on a substrate, where the particles can resist sintering and further densification at high temperatures. These materials may be formed by generating an arc using a one-sided electrode apparatus, where particles produced by the arc and electrode can impinge on the substrate and adhere to it. The coating can include predominantly undensified small particles which can have a size less than about 1 μm. These materials can have an emissivity greater than 0.8 or 0.9. Such materials can be used to form infrared emitters which may provide greater energy efficiency and increased operating lifetime as compared to uncoated emitters. Surfaces coated with small particles may be used in further applications such as catalytic or reactive surfaces, engine components, or acoustical dampening surfaces.

17 Claims, 14 Drawing Sheets

(56) References Cited

U.S. PATENT DOCUMENTS

| | | |
|---|---|---|
| 6,806,207 B2 | 10/2004 | Huang et al. |
| 7,179,505 B2 * | 2/2007 | Yoon et al. ............... 427/249.15 |
| 2002/0021482 A1 * | 2/2002 | Fitzmaurice et al. ......... 359/265 |
| 2002/0026856 A1 * | 3/2002 | Suzuki et al. ................... 75/343 |
| 2002/0160166 A1 * | 10/2002 | Hattori ........................ 428/212 |
| 2003/0000826 A1 | 1/2003 | Krempel-Hesse et al. |
| 2003/0175558 A1 * | 9/2003 | Kim et al. ..................... 428/698 |
| 2003/0228416 A1 | 12/2003 | Iwamaru |
| 2004/0033312 A1 * | 2/2004 | Pan .............................. 427/304 |
| 2004/0087439 A1 * | 5/2004 | Hwang et al. ................. 502/302 |
| 2005/0118427 A1 | 6/2005 | Linden et al. |
| 2005/0162728 A1 * | 7/2005 | Warner et al. ................. 359/273 |
| 2006/0081462 A1 * | 4/2006 | Goto et al. .................... 502/101 |
| 2006/0194688 A1 * | 8/2006 | Sundberg et al. ............... 501/87 |

FOREIGN PATENT DOCUMENTS

| | | | |
|---|---|---|---|
| JP | 2005026225 A | * | 1/2005 |
| WO | WO2007114852 | | 10/2007 |

* cited by examiner

MATERIALS HAVING AN ENHANCED EMISSIVITY AND METHODS FOR MAKING THE SAME

CROSS-REFERENCE TO RELATED APPLICATIONS

This application claims priority to and benefit of International (PCT) Patent Application No. PCT/US2007/060621, filed Nov. 7, 2006 which claims priority to and benefit of U.S. Patent Application No. 60/733,808 filed on Nov. 7, 2005, the disclosures of which are incorporated herein by reference in their entirety.

FIELD OF THE INVENTION

The present invention relates to materials having an enhanced emissivity and methods for making the same, and for example, to materials having a porous coating of particles which are resistant to densification.

BACKGROUND

Heat from a combustion reaction can be converted to a more uniform radiation, which can be in the infrared ("IR") range, by an emitter plate which can be heated by the reaction and may become red hot. A gas/air mixture entering a distribution chamber can be dispensed uniformly over a radiating surface of the emitter, where the surface may be approximately parallel to a paper or textile web. Heat produced in a combustion chamber can be initially contained in the flue gases, and may then be converted to IR radiation.

Surfaces can emit thermal radiation when heated. However, at a particular temperature and wavelength, there can be a theoretical maximum amount of radiation that any surface can emit. A surface that emits this maximum amount of radiation can be referred to as a "black body." Certain equations such as, e.g., Planck's Law, may be used to calculate the amount of radiation emitted by a surface as a function of wavelength and temperature. Most surfaces are not black body emitters, and are capable of emitting only a fraction of the amount of thermal radiation that a black body would emit under similar conditions. This fraction can be referred to as emissivity. For example, a surface which emits half as much radiation at a given wavelength and temperature as a black body may have an emissivity of 0.5. A "universal" black body can be considered to have an emissivity of 1.0 at all temperatures and wavelengths. Table 1 provides typical emissivities of various materials and surfaces coated with vapor deposits.

A black body surface condition (e.g., an emissivity equal to 1) can be approached by providing a deep hole (e.g., a pinhole) where radiation may be reflected several times along the walls of the hole before emanating from the hole. This type of an efficient emitter can thus be a deep object. The geometric shape of such a black body can be based on, e.g., performance, total size and/or production costs. For example, a black body can have a form of a hollow spherical shell which includes a hole in the shell, and a viewing port may be provided off-axis so that the interior surface is seen at an angle. The effective emissivity of such a spherical shell can depend on, e.g., temperature uniformity, emissivity of an interior surface of the shell, and a ratio of the viewing port size to the sphere size. It may be difficult to uniformly heat such a sphere, and this type of black body may be of primarily theoretical interest rather than having practical uses.

Other geometrical configurations may be used to construct objects that can behave similar to black bodies such as, for example, cylindrical cavities, conical cavities and/or double cones. These configurations can promote multiple reflections of emitted energy in a manner similar to that of a spherical shell. The effective emissivity of such configurations can approach a theoretical maximum (e.g., an emissivity very close to 1) if they are properly designed and fabricated. Plates that are approximately flat may generally have a lower emissivity than other shapes, but they can be preferred in practical applications where large, uniform areas are desired for emission of radiation. Such large emitting areas can be used, e.g., for drying paper webs or textiles during production thereof. Surface emissivity can be an important factor for energy radiation performance when a flat plate is used. A higher emissivity value for a surface can provide, e.g., more efficient radiation and/or cooler operating temperatures for a given rate of IR emission.

Properties and performance of IR emitters may be understood in part by considering, e.g., the Stefan-Boltzmann equation which relates a power density q radiated by a "gray body" (e.g., a radiating object having an emissivity less than that of a black body) to a temperature of the body. The Stefan-Boltzmann equation can be written as:

$$q = A\sigma \in T^4 \quad (1)$$

where the power density q can be expressed in units of W/m$^2$, the Stefan-Boltzmann constant $\sigma=5.67\times10\text{-}8$ W/(m$^2$-K$^4$), a material-dependent emissivity $\in$ can be between 0 and 1, inclusive, and T can represent the absolute temperature of the body in degrees Kelvin. The parameter A can represent a nominal area of the body (e.g., a cross-sectional area taken normal to a portion of the body). A surface can have an effective area which may be larger than the nominal area A. For example, a rough surface can have an effective area which may be larger than that of a similarly-sized smooth surface. A surface area density can refer to a ratio of the effective area of a body or surface to the nominal area. For example, a smooth surface can have a surface area density of approximately 1, and a rough surface may have a surface area density greater than 1. Such increases in surface area density can lead to an increase in the emissivity E as described in Eq. (1), which can be based on the nominal area A. However, surface roughening using conventional techniques such as, e.g., machining, grinding and/or peening may not provide a significant increase in the effective surface area, and the increase in surface area density provided by such techniques may diminish at high temperatures.

TABLE 1

Approximate emissivity values for various materials and coatings.

| Material | Emissivity |
| --- | --- |
| Brilliant Aluminum Paint | 0.31 |
| Finch Aluminum Paint 643-1-1 | 0.23 |
| Dupont Silver Paint 4817 | 0.49 |
| Chromeric Silver Paint 586 | 0.30 |
| Black Chrome | 0.62 |
| Black Copper | 0.63 |
| Black Nickel | 0.66 |
| Polished Nickel | 0.072 |
| Vapor deposited Aluminum | 0.02 |
| Vapor deposited Aluminum on Fiberglass | 0.07 |
| Vapor deposited Aluminum on Stainless Steel | 0.02 |
| Vapor deposited Chromium | 0.17 |
| Vapor deposited Germanium | 0.09 |
| Vapor deposited Gold | 0.02 |
| Iron Oxide | 0.56 |
| Vapor deposited Molybdenum | 0.21 |
| Vapor deposited Nickel | 0.04 |

TABLE 1-continued

Approximate emissivity values for various materials and coatings.

| Material | Emissivity |
|---|---|
| Vapor deposited Rhodium | 0.03 |
| Vapor deposited Sliver | 0.02 |
| Vapor deposited Titanium | 0.12 |
| Vapor deposited Tungsten | 0.27 |

Radiation output of an emitter can be proportional to the fourth power of the absolute temperature T, as described in Eq. (1). Minor increases in temperature can thus result in a much greater radiative output q and a corresponding increased drying effect. However, conventional emitter materials may not be suitable for constant operation at very high temperatures, which can reduce their service life (e.g., by high temperature corrosion). A maximum radiation output which can maintain a sufficiently long service life may thus be limited by the emitter material's resistance to a degradation at high temperatures.

Energy from the combustion reaction, which may be contained in a flue gas, can be transferred convectively to an emitter, e.g., by flow of the hot gas along a solid body. This mechanism can affect the efficiency of gas-fired IR emitters. For example, energy emitted in the form of IR radiation may first be transferred convectively to the emitter. Thus, both thermal radiation and convective heat transfer can affect the performance of gas-fired infrared emitters.

A specific convective heat transfer rate Q, in units of W/m$^2$, can be described by the following equation:

$$Q = \alpha(T_{fg} - T_e), \quad (2)$$

where $\alpha$ can represent a heat-transfer coefficient in units W/m$^2$-K. The temperature of the flue gas, $T_{fg}$, may not exceed an adiabatic flame temperature. This adiabatic flame temperature, for example, can be raised by preheating the combustion air and/or by using pure oxygen instead of air as a combustion gas. A reduction of the emitter operating temperature, $T_e$, which can increase the convective heat transfer rate Q as suggested by Eq. (2), may not be desirable because it can also reduce the radiation output. Greater convective heat transfer may be achieved, e.g., by increasing the heat-transfer coefficient $\alpha$. This parameter can be varied by varying fluid dynamical behavior and surface characteristics within the combustion chamber.

Gas-fired IR emitters which may be used in the paper and/or textile industry can be classified into general groups based on the material used to form them, e.g., fiber emitters, ceramic emitters and metal emitters. Such emitters can preferably have some or all of the following features: long service life, ignition reliability, high output level, short heat-up and/or cool-down time, and cross-directional moisture control.

A fiber emitter can include a fiber mesh formed of, for example, metal fibers that can be approximately 3 mm thick or ceramic fibers which may be up to approximately 25 mm thick. Such fibers can provide a temperature barrier in fiber emitters. A gas/air mixture can flow through almost the entire cross-sectional surface of the fiber mesh, which can cool the mesh and also lead to relatively low gas-flow velocities. The actual combustion process can occur at least partially in the outer layer of the fiber.

Fiber emitters may be of limited use for applications in the paper industry because of low flow velocities and unfavorable convective heat transfer performance (which may operate at, e.g., approximately 30-35% efficiency). Also, a flame in such an emitter can be easily disturbed by secondary air currents such as those which may be associated with an adjacent moving sheet or web. Increasing the thermal input power supplied to such an emitter (e.g., by increasing the gas/air flow rate) above a critical level can causes the flame to rise above the fiber surface and burn unevenly. Such uneven combustion can be referred to as a "blue flame mode" and can lead to a rapid decrease in the level of radiation output from the emitter.

Gas-fired infrared ("IR") emitters which may be used in the paper and/or textile industry can be classified into general groups based on the material used to form them, e.g., fiber emitters, ceramic emitters and metal emitters. Such emitters can preferably have some or all of the following features: long service life, ignition reliability, high output level, short heat-up and/or cool-down time, and cross-directional moisture control.

A fiber emitter may be prone to damage caused by clogging of the fiber mesh. Gas flow may be blocked in certain portions of the mesh, which can cause an irreversible reduction of the radiating surface. Such degradation in a fiber emitter performance can be referred to as a "coating-color splash."

As the flame burns in an outermost layer of a fiber mesh (where the outer layer may be, e.g., approximately 0.3 mm deep) and the mesh is relatively open, short heat-up and cool-down periods may be achieved. For example, the fibers may reach an operating temperature within about 3 seconds and may cool down at a similar rate. However, the advantages of such a short cool down time may be partly offset by the considerably longer cool-down times which may be present for connected housing components. In contrast to the fiber material, these components may not be cooled by the flow of combustion air after the emitter has been turned off, which can lead to a slower temperature decrease.

Fiber emitters may thus be preferable for applications where brief heat-up and cool-down periods take priority over robustness and performance. The disadvantages of fiber emitters described herein can be compensated for to some extent, e.g., by providing a secondary radiation element such as, for example, a screen that may partially shield the combustion chamber. Combustion gases or fumes can first contact the metal or ceramic fibers of the emitter and transfer a certain amount of heat. The fumes may then exit the fiber mesh and exchange further heat with the screen at a lower temperature. The heated screen may thus provide a secondary source of infrared radiation. Also, the screen can reflect some of the heat back toward the fiber, which may intensify combustion on the fiber surface. This intensification can also inhibit separation of the flame from the mesh surface at high temperatures. Such effects can be used to raise the output level of a fiber emitter, e.g., to approximately 44%. The use of a secondary radiation element may also reduce susceptibility of the flame to disturbances from air currents, and thereby reduce the occurrence of coating-color splashes. However, providing a secondary element can introduce additional mass that may be heated up and cooled down, which can reduce the advantages described herein for emitters having a low thermal inertia.

Ceramic emitters can include a perforated ceramic plate which may provide a temperature barrier. The number and size of the holes in the ceramic plate can be configured to provide a higher gas-flow velocity than may be present in fiber emitters. Thus, combustion processes associated with ceramic emitters may exhibit enhanced stability with respect to secondary air currents. The output level of such emitters may also be relatively low (e.g., approximately 44%). A screen may be generally used as a secondary radiation element with ceramic emitters, because heat reflected by the screen can be used to ignite the gas/air mixture as it exits the perforated ceramic plate. Although most characteristics of a ceramic emitter may be comparable to those of a fiber emitter, ceramic emitters can provide a higher power density because refractory ceramic plates can operate at higher temperatures than conventional mesh materials.

Metal emitters can provide an encapsulated combustion chamber which shields combustion and heat-transfer processes from outward influences such as, e.g., secondary air currents and coating-color splashes. This can be achieved by providing steel plate-formed elements into a screen which may be otherwise similar to screens used in other types of emitters. Metal emitters can provide improved convective heat transfer rates for a given volumetric flow rate of gases using an impinging flow. For example, a metal nozzle plate and a vacuum-formed ceramic structure may be provided instead of a perforated ceramic plate. The lower number of gas-flow orifices in such a configuration can produce increased gas-flow exit velocities.

A metal emitter may be configured using impingement plates (e.g., IR radiators) provided in proximity to nozzle orifices. Such configuration may provide improved heat transfer efficiency which may be as high as, e.g., approximately 52%. A vacuum-formed structure that may be used in metal emitters (instead of, e.g., the perforated ceramic plate used in ceramic emitters) can provide improved insulating properties and may be less susceptible to damage by a thermal and/or mechanical shock. A relatively weak, vacuum-formed ceramic insulation can be used in the metal emitters because the metal nozzle plate can provide or increase mechanical stability. However, metal emitters may have a large thermal inertia because they can contain a greater mass of material that is heated during use. Operating procedures may often be adjusted to reduce the negative effects of this larger thermal mass.

High temperature alloys may often be used in applications relating to energy conversion including, e.g., emitters, combustion engines, etc. Desirable properties of alloys in such applications can include, e.g., low weight and good mechanical stability. These properties can allow cost-effective and environmentally compatible operation of facilities such as, e.g., power plants and vehicles including cars, trucks and airplanes. Materials used in high temperature applications can be exposed to aggressive environments, and their performance, mechanical integrity and/or usable lifetime can be impaired by oxidation and/or corrosion. For example, a formation of a stable protective oxide scale on a surface of such materials can protect them at high temperatures. An aluminum oxide compound (alumina, e.g., $\alpha$-$Al_2O_3$), can provide effective protective properties due to its high thermodynamic stability and relatively slow growth rate. Thus a mechanically stable layer of alumina may be desirable to protect materials used in high-temperature applications. Materials which can form alumina can include, e.g., aluminum alloys, intermetallics, superalloys, Fe—Cr—Al alloys and other ferritic high chromium alloys.

The rate of growth and quality of an oxide surface (e.g., alumina) can be a significant factor in determining service life of a high-temperature component. For example, oxide layers may spall (e.g., crack and peel off), and spalling may become more pronounced in thicker oxide layers. A reduction of oxide growth rates on a material under high-temperature service conditions may also reduce the extent of spalling and can increase service life. Growth of a higher quality oxide layer may also reduce the occurrence of spalling, and may further enhance the service life. A loss of oxide layers from spalling can also lead to an additional oxidation of underlying material, and may impair the mechanical integrity of the material.

Improving the emissivity of an metal emitter can enhance energy efficiency and energy conservation, and may lead to improved service lifetimes by limiting oxide formation and reducing the occurrence of spalling. One of the objects of the present invention is to provide materials and methods for making them which overcome some of the above-described deficiencies.

SUMMARY OF EXEMPLARY EMBODIMENTS OF THE INVENTION

The exemplary embodiments of methods and materials according to the present invention may be capable of providing one or more coating layers of closely spaced, but partially separated (e.g., not fully sintered) small material particles on a surface of a metallic plate or other substrate. Small particles may have a size of, e.g., less than about 1 µm, between about 0.01 and 1 µm, between about 0.01 and 0.8 µm, between about 0.01 and 0.5 µm, or between about 0.02 and 0.5 µm.

For example, a coating of small particles may be provided on a substrate using a single-sided electrode arrangement, which can include a power generator, a Pi circuit or equivalent circuit, and an electrode. The power generator can be a high-frequency generator. The electrode may have a form of a rod or wire, and may include $SiO_2$, $Si_3N_4$, SiC and/or $MoSi_2$, and may further include a silica coating. In one exemplary embodiment of the present invention, the electrode may be a sharpened or thinned molybdenum silicide rod which may be coated with a mixture of $SiO_2$, $Si_3N_4$ and/or SiC. Alternatively, the electrode may have a form of an electrically conductive rod coated with a mixture of $SiO_2$, $Si_3N_4$, SiC and/or $MoSi_2$. The coating may be provided by producing an arc at a distal end of the electrode, and placing the surface to be coated in proximity to the arc. The arc may be continuous, and it can be formed in the absence of a nearby object that is electrically grounded. Particles produced by an interaction between the arc and the electrode material can generate a discharge of particles which may impinge on the surface and adhere to it.

The particles may include oxygen, nitrogen, silicon, silica, aluminum, silicon nitride, carbon, silicon carbide and/or iron oxide, and may have a size less than about 1 µm. In certain exemplary embodiments of the present invention, the particles may have a size between about 20 nm and about 500 nm. The particles may have a shape that is approximately, spherical, cylindrical, acicular, or a mixture of these geometries. The small particles which can form the coating may be unsintered or only partially sintered, and may retain an open porous structure even at high temperatures. The particles can also remain adherent to the substrate and may resist further densification and pore closure at temperatures which can be at least as high as half an absolute melting temperature of a constituent in the substrate which has the lowest melting point. The surface area density of the surface coated with small particles may be approximately 3 or 4.

In a further exemplary embodiment of the present invention, a metal emitter can be provided which may include a coating of small particles. Such coating layers can be used to improve the thermal emissivity of an emitter surface. The emitter may be formed from, e.g., a high-temperature Fe—Al—Cr alloy (e.g., 21% Cr, 5.8% Al, and the balance Fe). The coated emitter can have an emissivity that may be about 15%, 20%, or up to about 25% greater than that of a similar but uncoated emitter, and larger increases in emissivity may be possible. Emissivity values for such coated materials may be greater than about 0.8, or greater than about 0.9.

Emitters formed using such coated materials may be used, e.g., to dry paper or textiles during their production or processing, or to dry paint, varnish or other applied liquid coatings.

In another exemplary embodiment of the present invention, materials coated with small particles may be provided for various applications. Such exemplary applications can include, e.g., catalytic surfaces to enhance chemical or thermophysical reactions, surfaces which may reduce sound reflections or dampen acoustical vibrations, and/or surfaces which can slow down evaporation rates of water or other liquid films. Further applications of such materials can include, e.g., materials which may be used in heating or cooling devices or materials for which an enhanced emissivity may be desirable to promote, e.g., radiative heating or cooling behavior, such as, e.g., engine or reactor components.

For a better understanding of the exemplary embodiments of the present invention, together with other and further objects, reference is made to the following description, taken in conjunction with the accompanying drawings, and its scope will be pointed out in the appended claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF EXEMPLARY EMBODIMENTS

Figure 1:
FIG. 1 is an image of an exemplary metal emitter configuration which may be used with certain exemplary embodiments of the present invention.

An illustration of a conventional emitter made from an Fe—Al—Cr alloy is provided in FIG. 1. The distance between the legs in this emitter is approximately 1.5 cm. Such emitters can be used in a variety of drying, coating and/or heating machines. In a normal operation, a flame may impinge on one surface of the emitter plate and thermal radiation may be emitted from an opposite plate surface. The thermal radiation can have a wavelength, e.g., between about 1 and 3 microns. Such radiation can be useful for drying water from webs of paper or fabric in paper and textile mills. Emitter plates can be larger or smaller than that shown in FIG. 1, and they may include curved surfaces.

The base material used to form such emitter plates can be coated with particles which may include, e.g., a mixture of iron silicate, silicon nitride, alumina, silicon carbide, silica (e.g., any oxide of silicon), silicon, chromium and/or carbon. Such particle compositions may result from chemical combinations and reactions between materials used to form the particles with oxygen and/or nitrogen which may be present in the surrounding air during deposition of the particles on a surface. For example, oxynitrides and oxycarbides may be present in deposited particles. These particles may be applied using techniques described, e.g., in U.S. patent application Ser. No. 11/098,474. Such exemplary techniques which may be used to provide coatings of small particles are described in more detail herein.

In this invention a one sided discharge is taught where such a discharge allows either heat or particles from the discharge to become available for welding. In such a method, welding can be effectively carried out in a micro or large scale. The particles can act as the filler material thus reducing the need for more fillers. In this manner heat and mass can be usefully and simultaneously transferred to a workpiece.

The singular aim of the invention is to create an extremely high potential localized point in a material which will continuously disintegrate and discharge when it experiences very high frequency alternating (sine wave type) current, thus producing heat and heated mass either during or subsequent to the discharge. This is called a once sided electrode method. No second electrode is required. If a work-piece is involved such as for example a welding fixture or a substrate to be coated, it does not have to be grounded in any manner. The discharge can take place to open air or gas or any other dielectric fluid which has a low electrical conductivity. The alternating current can have a variety of other frequencies superimposed on (Fourier deconvolution).

By creating an immense potential point, an unstable situation is created which can lead to a metallic discharger apparatus proposed herein or the proposed method of discharger. The basic theory of operation of the metallic discharger is as follows: The metallic discharger can be created with the use of a modified high powered high frequency generator having a frequency preferably, but not limited to, in the range from 0.001 to 1000 Megahertz. For example a modified amplifier is connected to an output tank coil which is in a parallel resonant circuit (also commonly called a pi circuit) which, when tuned to resonance has a very high impedance and consequently high voltage across it. If the electrode is very fine the voltage moves to the end of the electrode. This high, potential energy had no place to go other than out at the end point of a wire or attached fine rod which projects into the atmosphere. This energy, as it rushed out at the small end point of the rod, causes the rod to get red hot and emit an arc like discharge.

A new unique method of the use of such a basic metallic discharger has now been discovered. It was discovered that the characteristic of the metallic discharger could be used as a way of making particles which can cause welding or coating because they posses both heat and kinetic energy in the discharge.

Figure 2A:
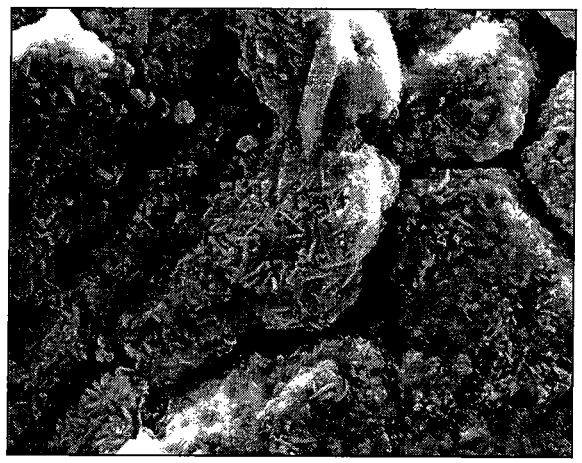
FIG. 2A is an exemplary image of stainless steel grains coated with small particles in accordance with exemplary embodiments of the present invention.
Figure 2B:
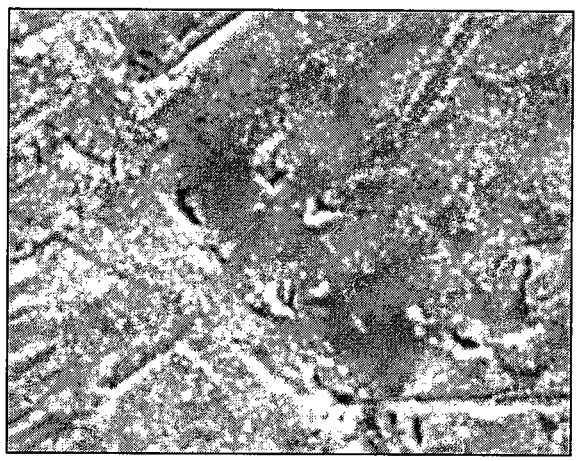
FIG. 2B is an exemplary image of an Fe—Cr—Al steel surface coated with small particles in accordance with particular exemplary embodiments of the present invention.

A high-magnification image of small particles deposited on grains of a mild steel is provided in FIG. 2A. The total width of the image in FIG. 2A is approximately one micron. FIG. 2B shows small particles deposited on a high-temperature iron-aluminum-chromium (Fe—Al—Cr) alloy. The total width of the image in FIG. 2B is about 20 microns. Particles shown in FIG. 2A may have an acicular form, whereas particles shown in FIG. 2B may appear more rounded or spheroidal. The effective surface area of a metal surface may be enhanced by both types of particles.

Figure 2C:
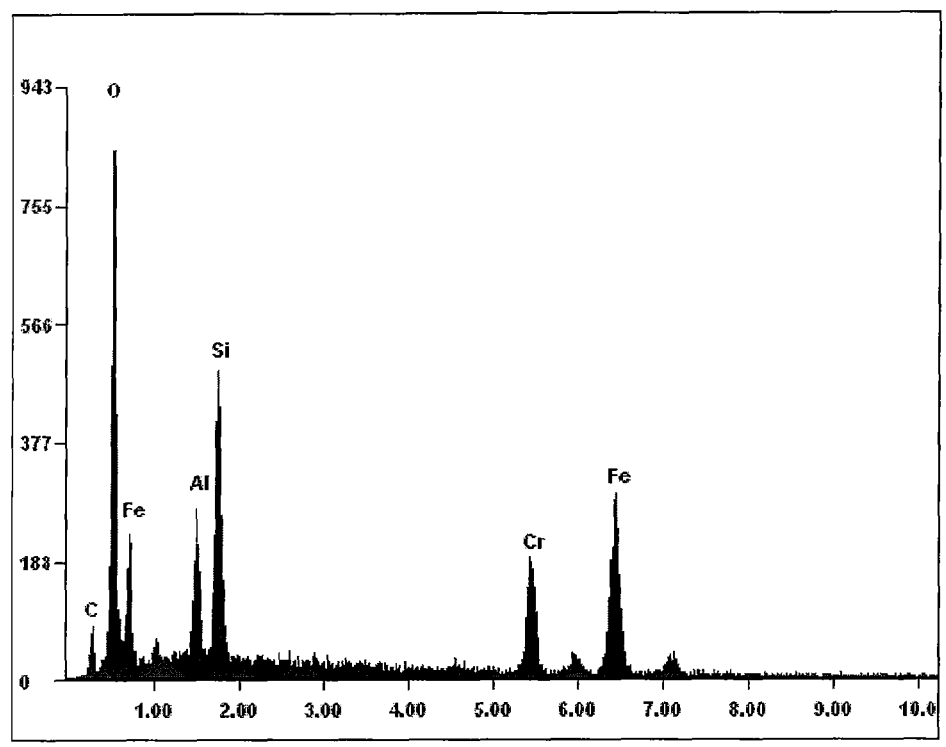
FIG. 2C is an exemplary energy dispersive X-Ray analysis of the small particles shown in FIG. 2A.

FIG. 2C is an exemplary graph of an energy dispersive X-Ray analysis of the small particles shown in FIG. 2A. This graph indicates that there may be high concentrations of carbon, silicon and certain other elements in the small particles.

Emitter plates made from a conventional high-temperature Fe—Al—Cr alloy (e.g., 21% Cr, 5.8% Al, and the balance Fe) can be tested to evaluate their radiative efficiency and high-temperature stability. A thermal behavior of emitter plates coated with small particles in accordance with exemplary embodiments of the present invention were compared with thermal behavior of bare (uncoated) emitter plates. In certain tests, a high-intensity flame was impinged on the emitter material for a predetermined duration or until certain damage to the material was observed. Various flame intensities were used in such tests, although the flame temperature was not measured directly. However, the flame impinged on a fractal ceramic surface in one test, and the temperature of the ceramic surface was then measured. Exemplary results of various thermal tests are provided in Table 2 and shown in FIGS. 3-11.

Figures 3A, 3B:
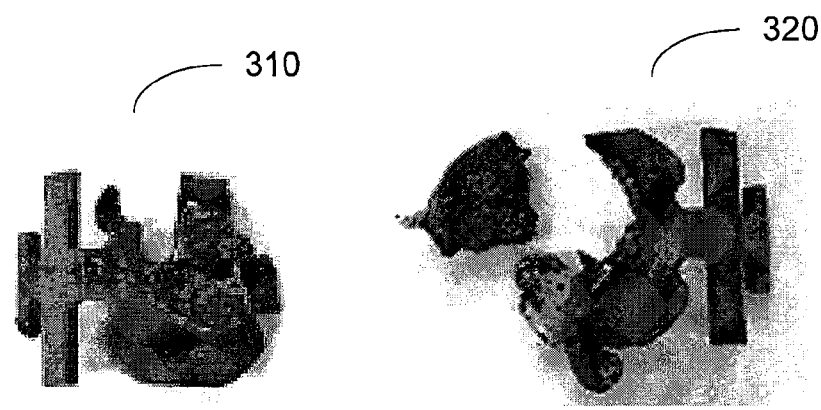
FIG. 3A is an image of an exemplary emitter coated with small particles after the thermal testing.
FIG. 3B is an image of an exemplary uncoated emitter after thermal testing.

FIG. 3A provides an image of an emitter 310 coated with particles after exposure to an intense flame for 17 seconds. FIG. 3B shows an untreated emitter 320 after exposure to a similar intense flame for 4 seconds. The emitters 310, 320 shown in FIGS. 3A and 3B correspond to test number 70 in Table 2. The coated emitter 310 appears to exhibit improved stability as compared with the untreated emitter 320, even after exposure to a flame for a longer time.

TABLE 2

Thermal test observations for bare (untreated) emitter materials and emitter materials coated with small particles.

| Test Number and material tested | Type of Flame | Time to destroy untreated (bare) material (seconds) | Time to destroy coated material (seconds), and observations | Temperature of ceramic fractal surface |
|---|---|---|---|---|
| 70 Emitter (Fe—Cr—Al) | Oxygen-propane gas flame | 4 s | 17 s | Not Measured |
| 91 Mild steel | Oxygen-propane gas flame | 13 s large hole | 24 s did not cut hole | Not measured |
| 92 Mild steel | Oxygen-propane gas flame | 18 s large hole | 22 s did not cut complete hole | Not measured |

TABLE 2-continued

Thermal test observations for bare (untreated) emitter materials and emitter materials coated with small particles.

| Test Number and material tested | Type of Flame | Time to destroy untreated (bare) material (seconds) | Time to destroy coated material (seconds), and observations | Temperature of ceramic fractal surface |
|---|---|---|---|---|
| 111 Emitter (Fe—Cr—Al) | | 35 s | 61 s Flame torch was closer to emitter than untreated emitter | Not measured |
| 116 Emitter (Fe—Cr—Al) | | 8 s Made through hole & got collapsed. | 8 s (80% hole) Did not collapse | Not measured Flame torch held vertical. |
| 118 Emitter (Fe—Cr—Al) | | 45 s* Collapsed | 76 s Did not collapse | 1372° C. on ceramic surface (not flame temperature). Flame torch held vertical. (*1350-1372° C.) |
| 119 Emitter (Fe—Cr—Al) | | 17 s Collapsed | 29 s | 1390° C. on surface (not flame temperature). Flame torch held vertical. |
| 120 Emitter (Fe—Cr—Al) | | 17 s Collapsed | 21 s Test stopped for comparison of surface, did not collapse. | 1390° C. on surface (not flame temperature). Flame torch held vertical. |

Figure 4A:
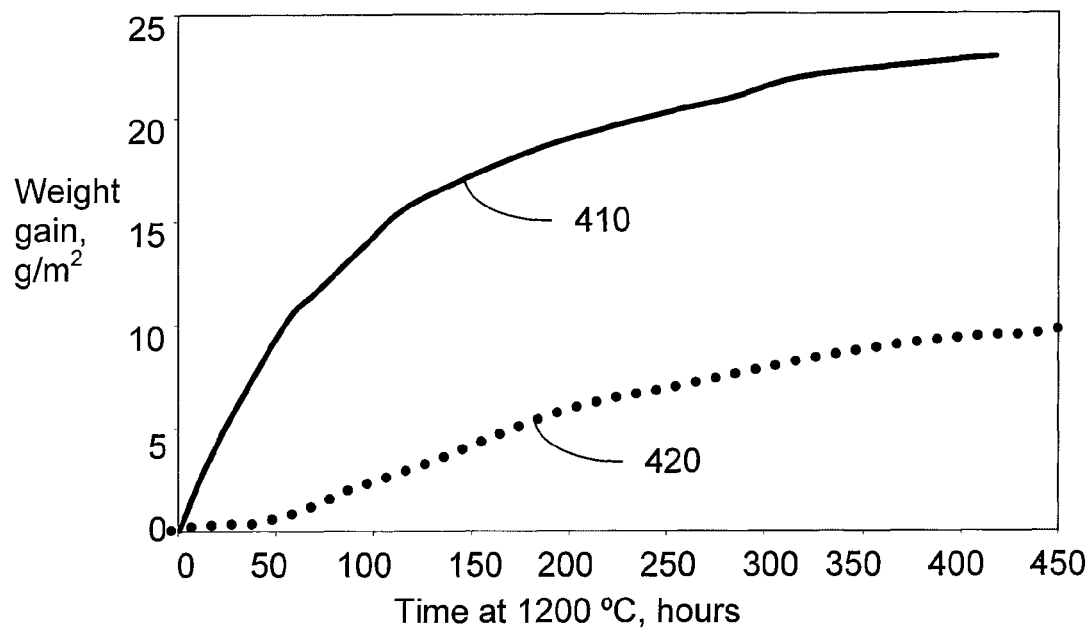
FIG. 4A is an exemplary graph of oxidative weight increase for a coated and an uncoated metal emitter.

The exemplary graph in FIG. 4A shows oxidation weight gain for a bare (untreated) surface 410 and a small particle-coated (treated) surface 420 of a Fe—Al—Cr alloy exposed to a temperature of about 1200° C. The base alloy tested had a nominal composition of about 21% Cr and 5.8% Al, with the balance being Fe. The furnace was a molybdenum disilicide furnace maintained at 1200° C. at a temperature uniformity within about ±3° C. The furnace included ports to allow free air flow. Test samples were weighed by removing them from the furnace every 12 hrs and cooling them to room temperature prior to weighing. Removal and replacement of test samples from the furnace was rapid. When the samples were returned to the furnace, the furnace recovered its nominal operating temperature within about 5 minutes. The time parameter on the x-axis in the plot of FIG. 4A indicates the total time a test sample resided in the furnace at an elevated temperature.

Results of the oxidation tests shown in FIG. 4A indicate that a smaller amount of small particle-coated (treated) test samples oxidized compared to bare (untreated) samples, and that the treated samples oxidized at a lower rate than the untreated samples. After about 450 hours exposure to high temperatures, a plateau condition for oxidation rate was observed for both treated and untreated emitter plates as compared with a parabolic oxidation rate observed at shorter times. The approximately parabolic form of the plot in FIG. 4A indicates that an adherent scale, which may be much thinner for a treated sample than for an untreated sample, may be present and help to prevent subsequent spallation. A longer service life for treated emitter materials may thus be possible as compared to untreated emitter materials under similar thermal conditions.

The test data shown in FIG. 4A can also indicate that only about 18 mg of emitter material was oxidized for the treated plates over 450 hours at 1200° C., whereas more than about 40 mg of the untreated emitter material was oxidized for the same time and temperature. These results suggest that materials coated with small particles may provide improved high-temperature oxidation resistance for other alloys which may form an oxide layer at high temperatures. Such alloys can include, for example, aluminum alloys, iron alloys, nickel alloys, molybdenum disilicide silicon carbide, etc. The oxidation rates indicated in FIG. 4A for treated material is almost half that of similar untreated material at a particular temperature. Even if oxidation rates of the two types of materials were similar, the test results suggest that a higher power can be tolerated by the treated material than by untreated material at a similar temperature.

Figures 4B, 4C:
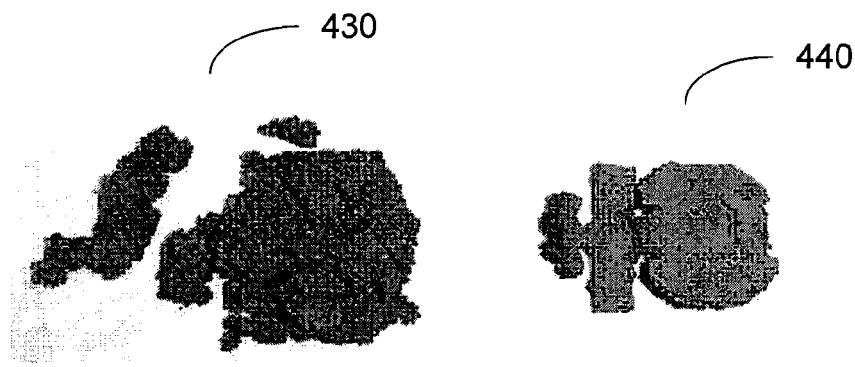
FIG. 4B is an exemplary image illustrating thermal stability at 1575° C. of the uncoated metal emitter.
FIG. 4C is an exemplary image illustrating thermal stability at 1575° C. of a metal emitter coated with small particles in accordance with certain exemplary embodiments of the present invention.

FIG. 4B shows an uncoated emitter 430, and FIG. 4C shows an emitter 440 coated with particles, after exposure to a very high temperature exposure of about 1575° C. for about one hour. This high temperature is close to the melting point of the Fe—Cr—Al alloy. The emitter plate 440 coated with small particles maintained mechanical integrity better than the untreated emitter 430 under similar high-temperature conditions.

Figures 5A, 5B:
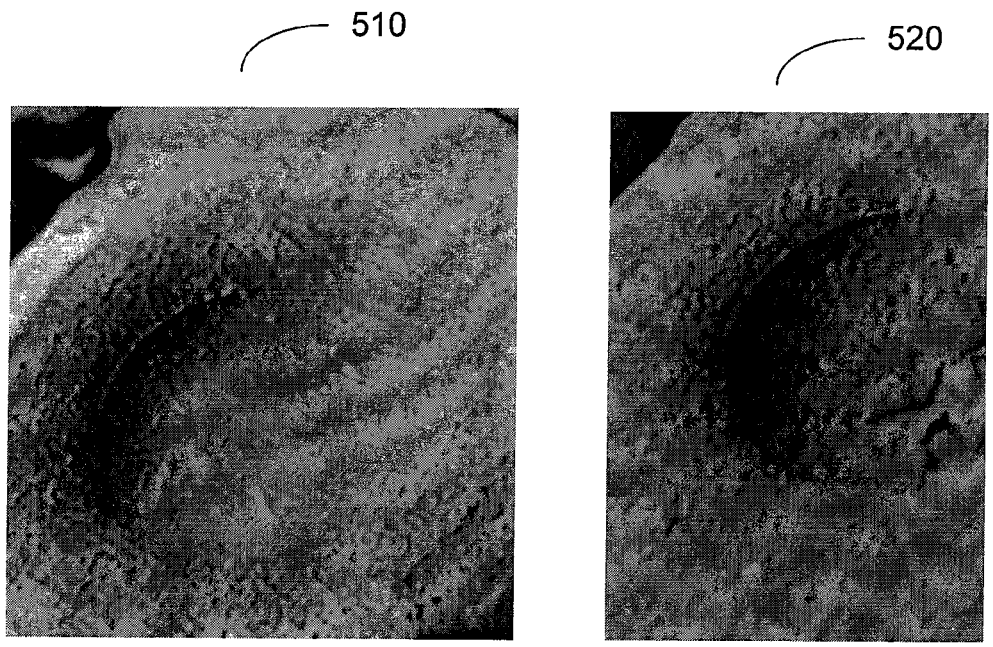
FIG. 5A is an image of an exemplary emitter surface coated with small particles after exposure to high temperatures for about 630 hours.
FIG. 5B is an image of an exemplary untreated emitter surface after exposure to high temperatures for about 630 hours.

FIG. 5A shows an image of a portion of an emitter plate 510 coated with particles (treated), and FIG. 5B shows an image of a portion of an uncoated emitter plate 520 which were exposed to an 8 kW flame for about 620 hours with daily cycling. The oxide surface of the untreated material 520 appears ready to peel or crack, whereas the oxide surface of the treated material 510 appears more uniform and less affected by the thermal exposure.

High temperature alloys can exhibit a continuous loss of weight during oxidation. Such alloys can form oxides which may be unstable or not adherent, which may readily spall or flake off and allow further oxidation of the underlying alloy substrate. Formation and flaking of such nonadherent oxide films can lead to mechanical degradation of such alloys.

Coated alloys formed in accordance with exemplary embodiments of the present invention may inhibit or stabilize oxide formation on such alloys, which can reduce erosion of the alloy and provide improved mechanical coherence and longer service lifetimes. These coated materials may also provide increased resistance to high temperature fatigue and high temperature creep.

A rapid test for emissivity and creep was developed which includes the effects of flame-based degradation of emitter material. A flame intensity number can be defined as the reciprocal of the time required for a particular flame to destroy an untreated emitter material sample. The destruction time can be evaluated as the total flame exposure time needed to either puncture or collapse the emitter (whichever occurred first for a chosen test criterion). Little variation in destruction time was observed among different test plates for a particular flame intensity, which may indicate the usefulness of the flame intensity number as a measure for comparative analysis of emitter lifetimes. Significant differences were observed between treated and untreated plates exposed to similar flames for similar durations. In general, the surface of treated emitters appeared less degraded than that of untreated plates exposed to similar flame conditions.

Figure 6:
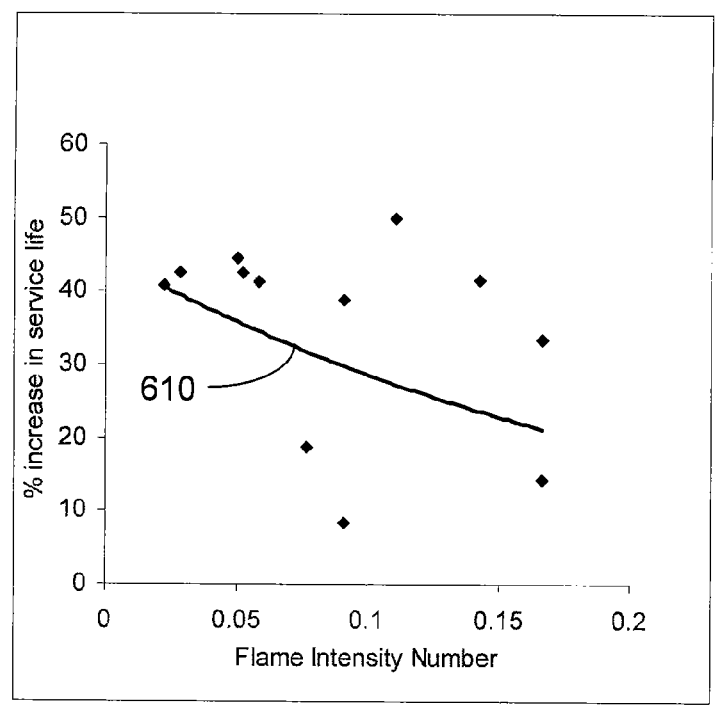
FIG. 6 is an exemplary graph of increased operating lifetime using oxy-propane flames and oxy-acetylene flames for metal emitters coated with small particles in accordance with particular exemplary embodiments of the present invention compared to measured lifetimes for uncoated metal emitters.

FIG. 6 shows a graph of percentage improvement in service life of emitters coated with small particles compared to uncoated emitters, when the emitters were exposed to intense oxy-propane flames and oxy-acetylene flames. The percentage of service life increase is shown as a function of the flame intensity number described herein. A flame intensity number of about 0.03 shown in FIG. 6 may correspond to a flame temperature of approximately 1600° C., and a flame intensity number of about 0.17 may correspond to a flame temperature of approximately 2300° C. As the flame temperature decreases (e.g., for lower flame intensity number), the percentage improvement of a treated emitter plate over an untreated plate was observed to increase approximately exponentially. The curve 610 which may be fitted to the data provided in the graph of FIG. 6 can be described by the following equation:

$$Y = 44.833 e^{-4.4754x} \quad (3)$$

Thus, at a particular flame temperature, an emitter coated with small particles in accordance with exemplary embodiments of the present invention may often provide a longer usable service life than a similar emitter that is uncoated.

Figure 7:
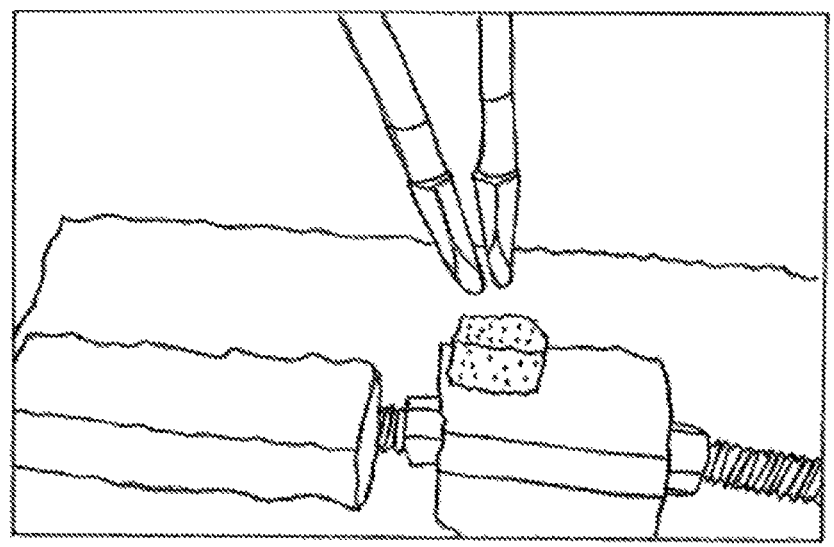
FIG. 7 is an image of an exemplary flame test apparatus which may be used to provide the exemplary data shown in FIG. 6.

An emissivity of emitter plates was tested by directing a high intensity flame at the plates. Such tests were performed using an apparatus similar to that shown in FIG. 7. For example, a jig may be provided to rigidly hold a torch, which may include two nozzles as shown in FIG. 7. The distance between the emitter plate and the nozzles was approximately 20 mm. Fractalin™ refractory (a high thermal shock-resistant refractory material) was placed below the flame, and a sample to be tested was then be placed on the refractory material. The time elapsed between introducing a flame to an emitter sample and the collapse of a sample under its own weight or perforation of the sample by the flame may be recorded. The time for collapse or puncture of a sample was generally observed to decrease with increasing flame intensity. At lower flame intensities, emitters may collapse before being punctured by the flame. Puncture of emitter samples before a collapse was observed for higher intensity flames.

Figure 8:
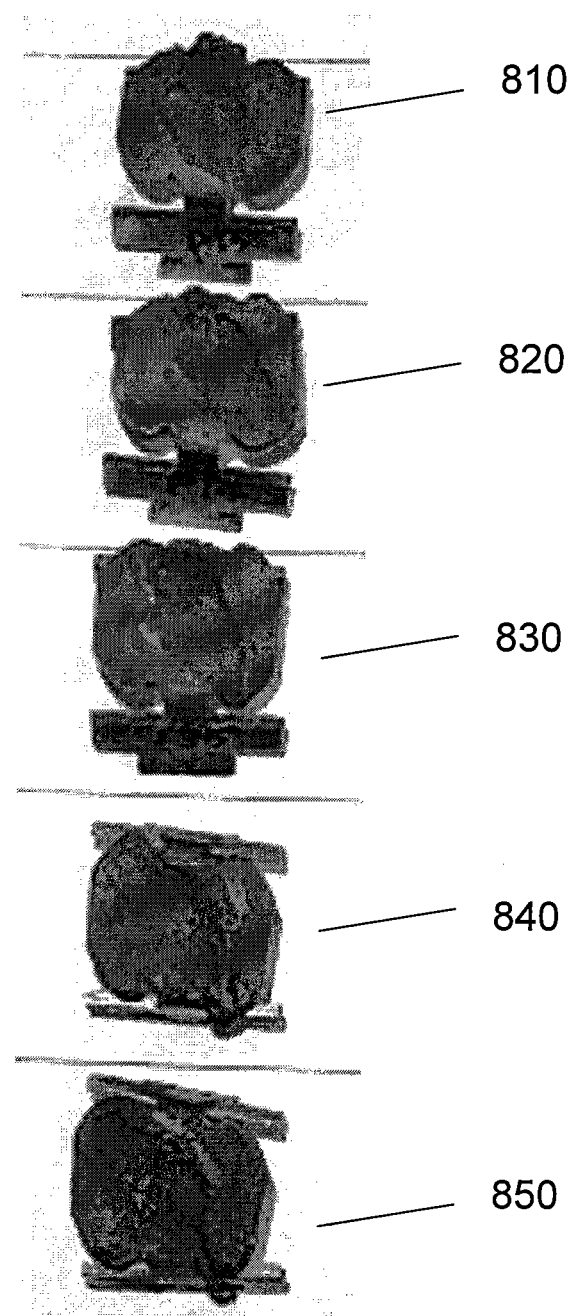
FIG. 8 is an image of exemplary coated and uncoated metal emitter test plates which were tested using the exemplary apparatus shown in FIG. 7.

FIGS. 8-11 provide images of the emitter plates after being exposed to various flames for certain time intervals. For example, a very high intensity flame was used to test the emitter samples shown in FIG. 8, and the test was concluded when surface melting was observed on a sample. In FIG. 8, the upper two emitters 810, 820 were untreated and were able to withstand the flame for about 6 seconds before beginning to melt on the surface. The lower three emitters 830-850 in FIG. 8 were coated with small particles and were able to withstand the flame for about 7 seconds before beginning to melt.

Figure 9:
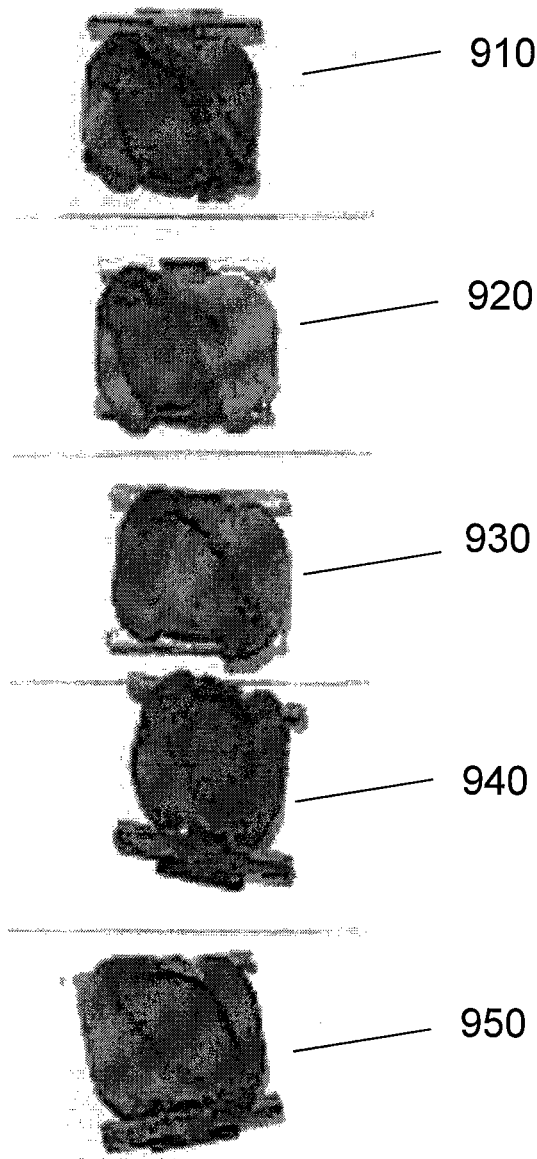
FIG. 9 is an image of further exemplary coated and uncoated metal emitter test plates which were tested using the exemplary apparatus shown in FIG. 7.

In FIG. 9, the upper two emitters 910, 920 were untreated and were able to withstand a high-intensity flame for about 7 seconds and 6 seconds, respectively, before beginning to exhibit surface melting. The lower three emitters 930-950 in FIG. 9 were coated with small particles and were able to withstand the high-intensity flame for about 12 seconds, 9 seconds and 9 seconds, respectively, before beginning to melt.

Figure 10:
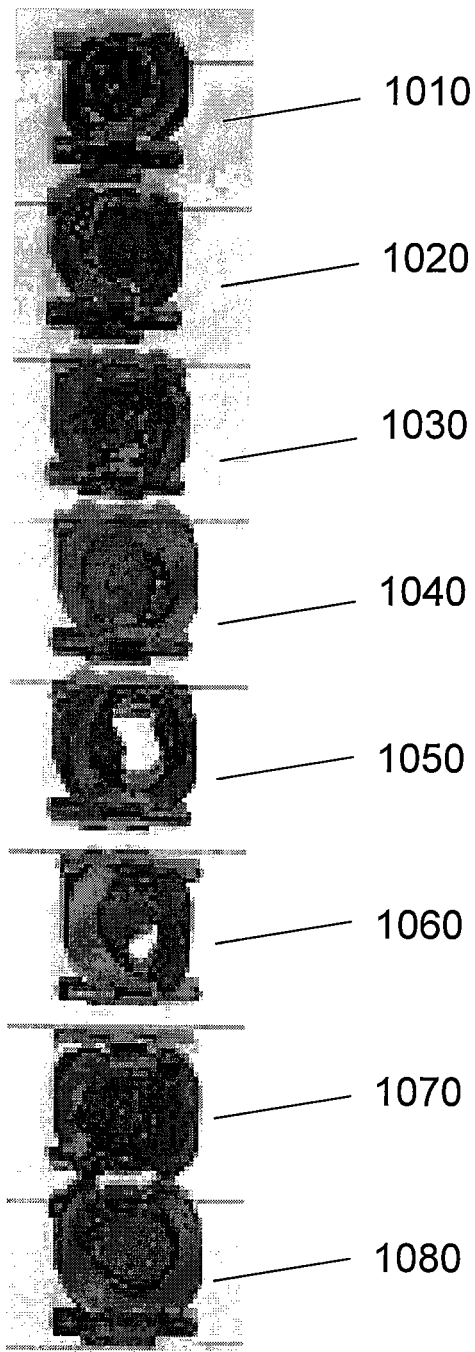
FIG. 10 is an image of yet further exemplary coated and uncoated metal emitter test plates which were tested using the exemplary apparatus shown in FIG. 7.

Eight emitter samples that were tested under a high-to-medium intensity flame are shown in FIG. 10. These samples were exposed to the flame until melting and a hole were observed. The emitters 1010, 1030, 1050 and 1070 remained untreated. The emitter 1010 lasted for 13 seconds before a hole was observed, and the emitters 1030, 1050 lasted for about 11 seconds each. The emitters 1020, 1040, 1060 and 1080 in FIG. 10 were coated with small particles in accordance with exemplary embodiments of the present invention. The emitter 1020 lasted for 16 seconds before a hole was observed, and the emitters 1040, 1060 lasted for about 12 seconds and 18 seconds, respectively. The emitter 1080 lasted for 18 seconds until melting was observed, and a hole was not seen on this sample.

Figures 11A, 11B:
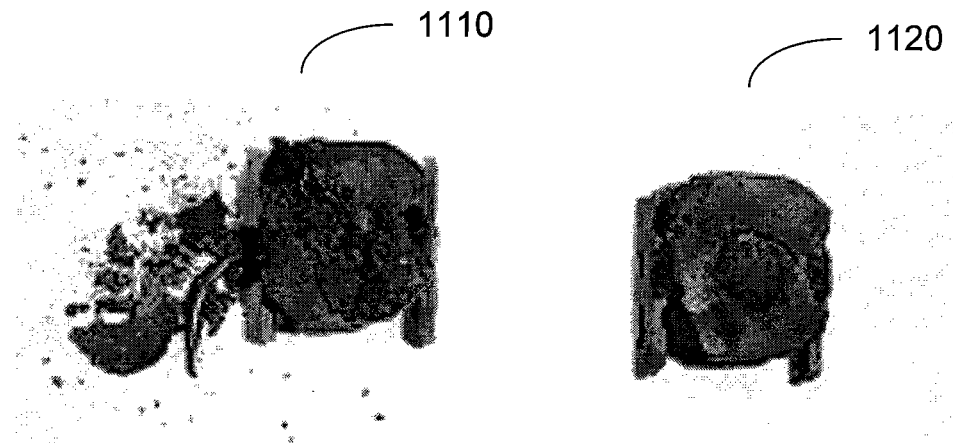
FIG. 11A is an image of an exemplary coated metal emitter test plate which was tested using the exemplary apparatus shown in FIG. 7.
FIG. 11B is an image of an exemplary uncoated metal emitter test plate which was tested using the exemplary apparatus shown in FIG. 7.

Two emitters 1110, 1120 exposed to a moderate intensity flame are shown in FIGS. 11A and 11B. The untreated emitter 1110 shown in FIG. 11A lasted for about 60 seconds before it physically collapsed. The emitter 1120 shown in FIG. 11B was coated with small particles, and lasted for 300 seconds under a similar flame before beginning to collapse.

Data from the flame test samples shown in FIGS. 8-11 were used to generate the graph shown in FIG. 6. The flame tests suggest that emitter plates coated with small particles show a significant increase in the time for degradation as compared to untreated emitter plates exposed to similar flames. The flame conditions used in these tests are much higher than the intensity of a flame typically used in paper or textile drying procedures. The emissivity of the treated samples may be greater than that of untreated samples, which may lead to lower overall emitter plate temperature and longer time until failure.

The emitter surfaces coated with small particles were observed to last longer than untreated surfaces in tests where the flame intensity was high enough to melt and destroy the base material. This indicates that the coated material may have a higher emissivity and thus remain cooler for a longer time. Oxide layer stability may also be enhanced by a lower surface temperature and a coating of small particles. This effect may be significant because iron alloys can melt below about 1538° C. and flame used in tests were extremely hot. A destruction of an emitter plate may be thermally activated, so coated emitters when used conventionally at lower temperatures, e.g., about 1000° C., may exhibit improved performance for several years. Greater energy efficiency and productivity may also be provided by such coated emitters as compared to uncoated ones.

The exemplary coatings containing small particles described herein may include mostly separated or lightly sintered particles provided on a surface. These sample particles may be bonded and/or attached to the surface for mechanical integrity, and may be present in an open porous configuration where particles may not be significantly fused to each other (e.g., they may not be densely sintered). The particles may also be provided in single or multiple layers.

Such exemplary configuration can provide a high density of surface area which may be maintained at high temperatures. This characteristic may distinguish coatings of small particles provided in accordance with exemplary embodiments of the present invention from conventional nano- or micro-coatings, where particles forming such coatings may be substantially fused or sintered together, even if the coating is porous.

The surfaces coated with small particles in accordance with certain exemplary embodiments of the present invention can provide and maintain desirable properties at high temperatures. This behavior may result from the retention of the small particles in an open porous configuration on the surface when heated. For example, the particles may be resistant to further sintering and/or densification when exposed to high temperatures. Oxide growth on such coated surfaces may also maintain a high specific surface area, because the particles may influence the early stages of oxide growth rates to maintain a rough surface topography.

Experimental observations also indicate that the small particles applied to material surfaces can also remain adherent to the substrate when exposed to high operating temperatures. Such temperatures can be at least as high as half an absolute melting temperature of a lowest-melting-point constituent in the substrate material. A constituent in the substrate material can refer to, e.g., a compound, an element, a phase, an intermetallic compound, etc., which may be identifiable in the substrate at a microscopic level.

The emissivity of emitter surfaces can be determined by combining measured temperature values obtained using a calibrated thermocouple with computational fluid dynamics ("CFD") numerical modeling, where the numerical modeling includes effects of both radiation and natural convection. Temperatures of sample plates heated by an electric current can be obtained and compared with numerical simulations to yield emissivity values. These determinations can indicate that emissivity generally increased with temperature. Emissivity of untreated emitters may be determined to increase by about 25% when coated with small particles as described herein.

Figure 12:
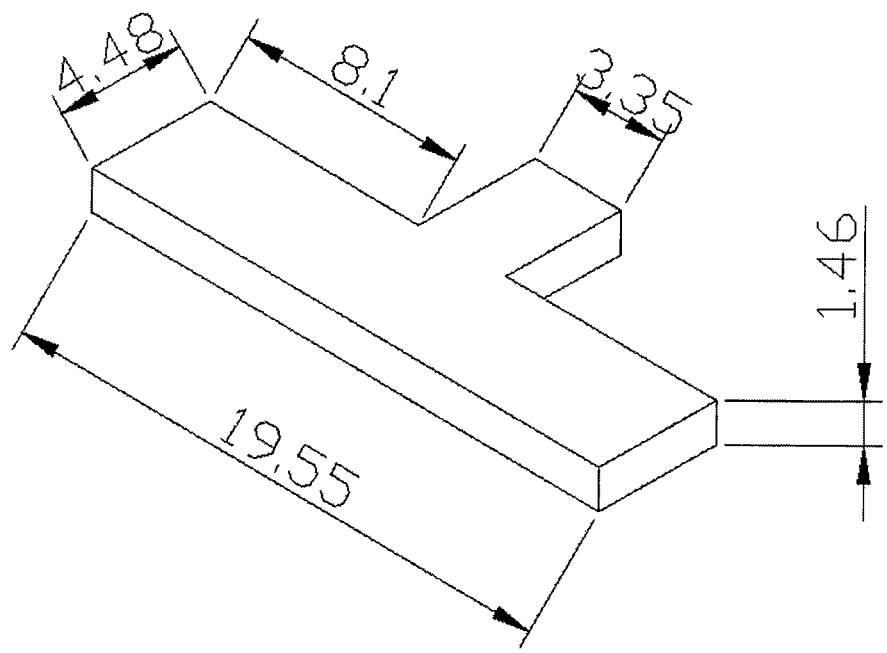
FIG. 12 is an exemplary illustration of a test plate geometry used with the exemplary apparatus shown in FIG. 7.

Test plates used to determine emissivities were cut from larger Fe—Cr—Al alloy plates. The exemplary dimensions of a test plate are provided in FIG. 12 in units of millimeters.

Figure 13A:
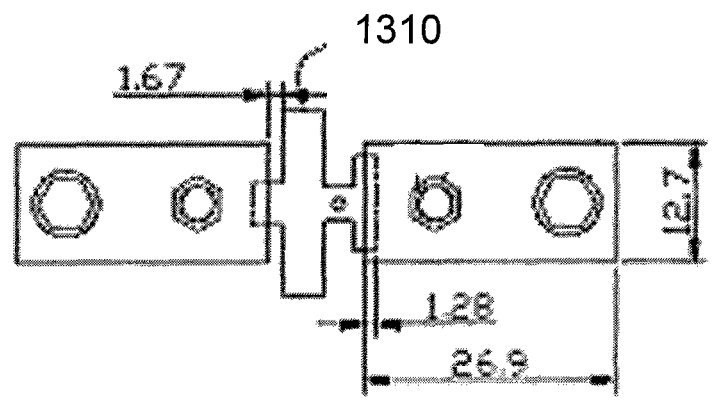
FIG. 13A is an exemplary schematic diagram of a top view of an electrical resistance heating rig which may be used to test metal emitter plates.
Figure 13B:
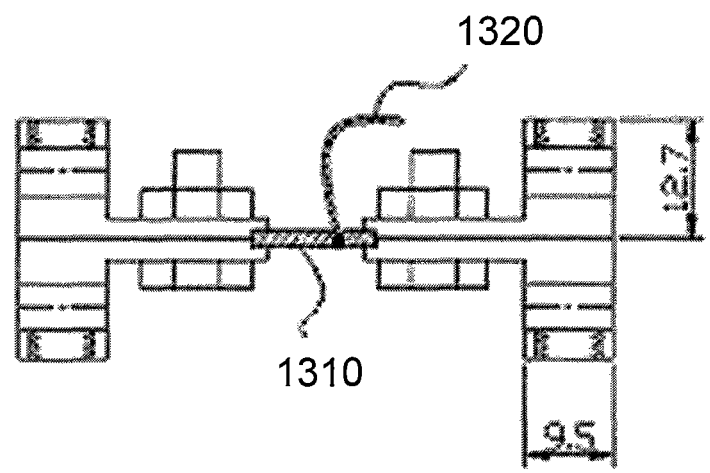
FIG. 13B is an exemplary schematic diagram of a side view of the electrical resistance heating rig which may be used to test metal emitter plates.

An electrical resistance heating rig which can be used to measure emissivities of the test plates is shown in FIGS. 13A and 13B. FIG. 13A shows a top view of an exemplary heating rig, including a test plate 1310. A side view of the heating rig is shown in FIG. 13B, with a thermocouple 1320 attached to the test plate 1310. The dimensions shown in the examples of FIGS. 13A and 13B are provided in millimeters.

Figure 14:
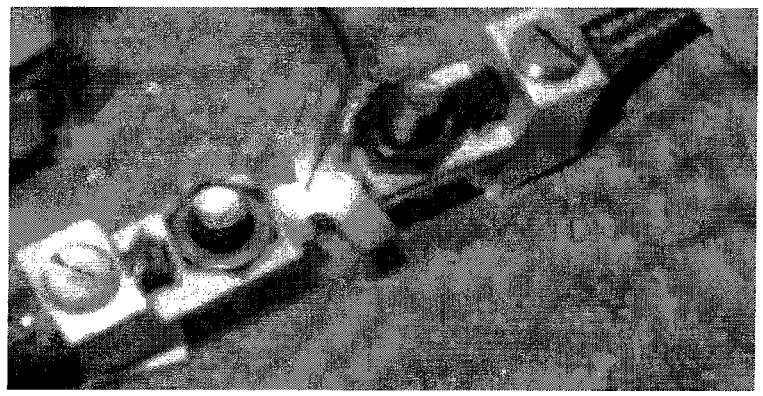
FIG. 14 is an exemplary image of a metal emitter plate such as that shown in FIG. 12 being tested using the electrical resistance heating rig such as that illustrated in FIGS. 13A and 13B.

An exemplary apparatus used to heat test plates using an electric current is shown in FIG. 14. The temperature of a test plate was measured using a K-type calibrated thermocouple. A blind hole (1.25 mm diameter, 1.3 mm deep) was drilled into each emitter test plate, and the thermocouple was inserted into the hole. Each test plate with an attached thermocouple was then heated by electrical resistance. A voltage applied to each test plate was varied by discrete values. A current drawn by the emitter test plate and a temperature measured by the K-type thermocouple were recorded at each voltage level. These measurements were performed for both untreated test plates and for test plates coated with small particles. Emissivity values associated with the test plates were then determined by solving an inverse problem, e.g., by matching estimated emissivity values with numerical simulation results to obtain a best fit of the data.

Figure 15:
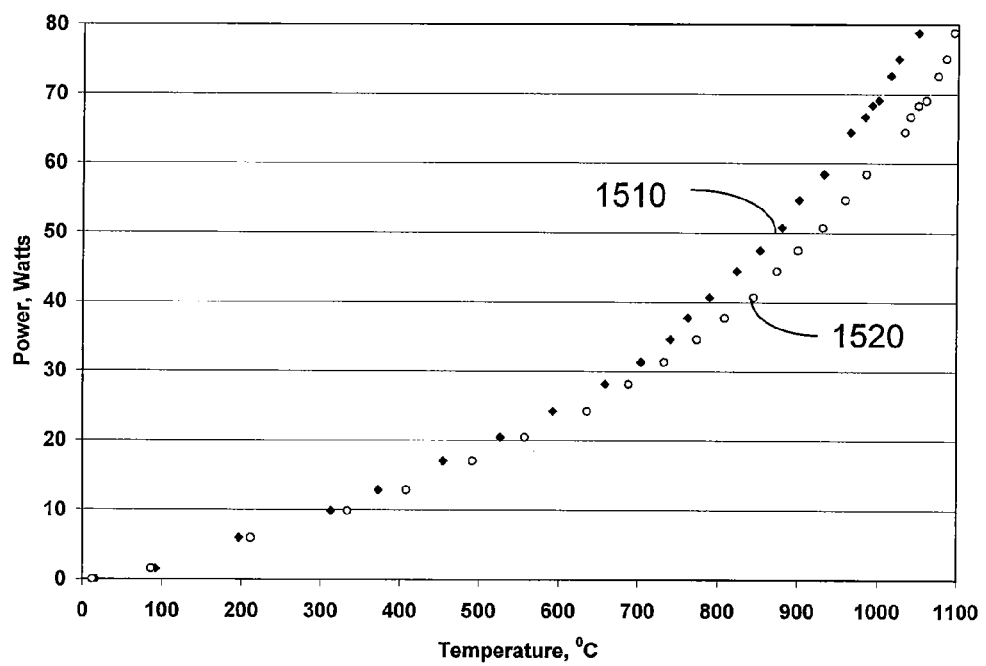
FIG. 15 is an exemplary graph of measured temperature vs. supplied power for metal emitters coated with small particles in accordance with certain exemplary embodiments of the present invention and for uncoated metal emitters.

A graph of measured temperatures of test plates as a function of applied power (e.g., $I^2R$) is shown in FIG. 15. The temperature of a plate coated with small particles and data therefore 1510 are observed to be lower than that of an untreated plate 1520 for each level of applied power. This exemplary result indicates that the emissivity of the treated plates is greater than that of untreated plates, which results in a cooler temperature. The resistivity of treated and untreated plates were observed to be approximately equal.

Figure 16:
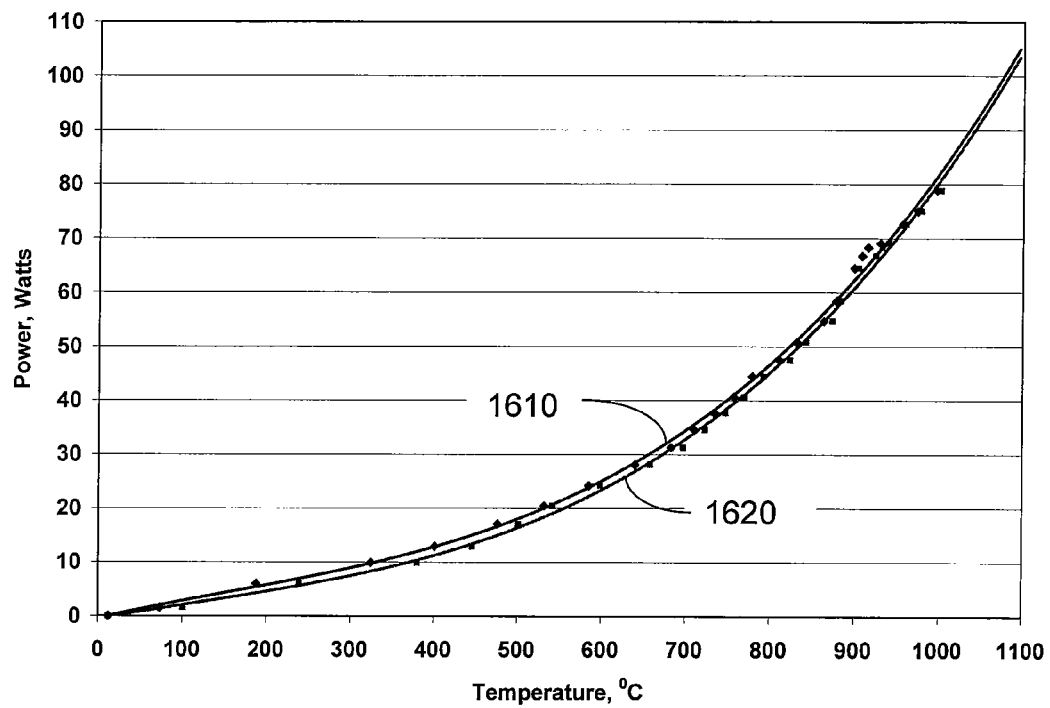
FIG. 16 is an exemplary plot of measured temperature vs. supplied power for oxidized metal emitters coated with small particles in accordance with certain exemplary embodiments of the present invention and for uncoated oxidized metal emitters.

The data points 1510, 1520 shown in FIG. 15 provide sampled curves that appear steeper at higher values of applied power. This result indicates that a greater increment of power can be applied to a plate for a given increase in temperature at higher temperatures Measured temperatures of oxidized test plates as a function of applied power (e.g., $I^2R$) are shown in the graph of FIG. 16. Both untreated plates and plates coated with small particles were oxidized at 1200° C. for 24 hours before testing. The temperature of a plate coated with small particles and data therefore 1610 can again be observed to be lower than that of an untreated plate 1620 for each level of applied power. The observed characteristics of oxidized plates shown in FIG. 16 are qualitatively similar to those shown in FIG. 15 for non-oxidized plates, although the differences between coated and uncoated test plates appear smaller for the oxidized plates. Data for oxidized coated test plates 1610 indicate that emissivity values are approximately 10% or more greater than corresponding emissivity values of uncoated oxidized plates 1620.

Numerical simulations were also performed to analyze emissivity of test plates. These simulations were use to determine radiative and convective heat transfer processes in the electric resistance heating experiments conducted. Simulations were performed based on a finite volume scheme using a commercially available thermal/flow solver (Fluent). An estimated value of plate emissivity used in the heat transfer/flow simulation was varied until a match was obtained between the simulated plate temperature and the experimentally measured temperature. A range of high-temperature conditions (e.g., temperatures similar to typical operating temperatures of conventional IR emitters) were simulated.

Figure 17A:
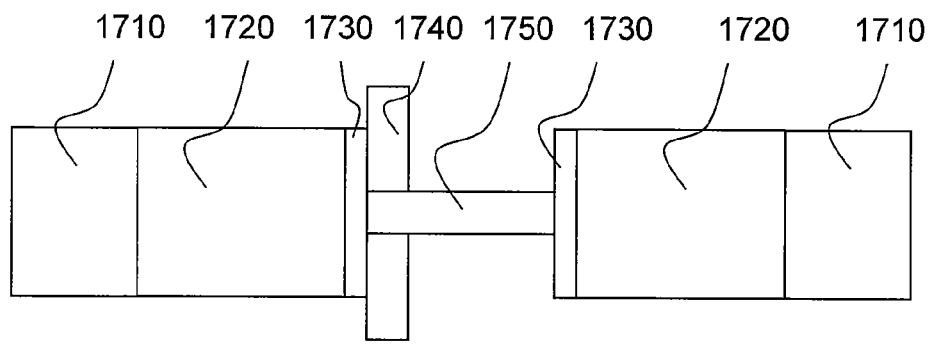
FIG. 17A is a top view of an exemplary heating rig and test plate geometry which may be used for thermal modeling of resistively-heated test plates.
Figure 17B:
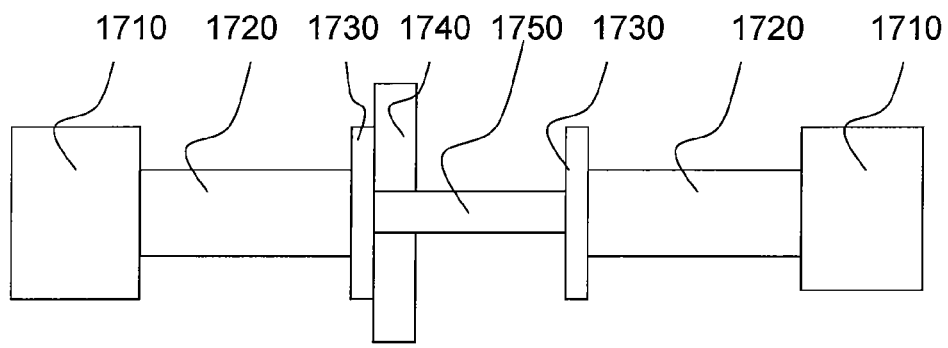
FIG. 17B is a side view of the exemplary heating rig and test plate geometry shown in FIG. 17A.

Top and side views of the exemplary apparatus geometry used in the numerical simulations are shown in FIGS. 17A and 17B, respectively. In these figures, emitter plate 1740, 1750 can be maintained in place by clamps represented by blocks 1710-1730. Blocks 1730 can be provided with a lower thermal conductivity than blocks 1710, 1720 to model thermal contact resistance between the clamps and the emitter plate. Volumetric heat generation is provided in block 1750 only because block 5 may be a path of least resistance for the applied electric current used to heat the plate 1740, 1750.

Figure 18:
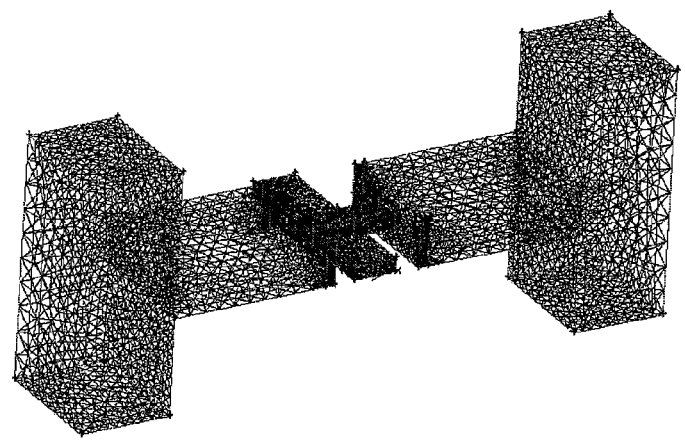
FIG. 18 is an exemplary illustration of a three-dimensional grid which may be used for numerical modeling of thermal behavior of the heating rig and test plate geometries shown in FIGS. 17A and 17B.
Figure 19:
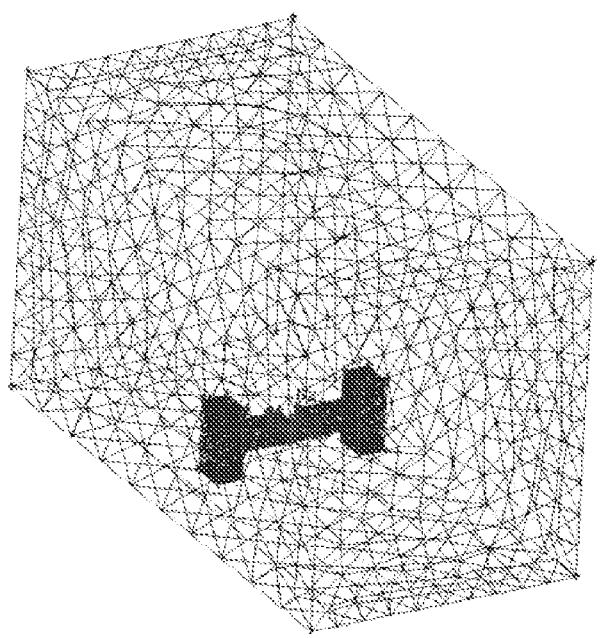
FIG. 19 is an exemplary illustration of another three-dimensional grid which may be used for the numerical modeling of the thermal behavior in a volume surrounding the heating rig and test plate geometries shown in FIG. 18.

Each block 1710-1750 can be represented by a computational "volume mesh" of tetrahedral cells, as shown in FIG. 18. An enclosure volume surrounding the clamps and emitter plate is also represented by a volume mesh, as shown in FIG. 19.

To perform numerical simulations of the electric resistance heating, a base of the enclosure volume and an enclosure side pressure inlet were provided with a fixed temperature of 300 K. The block 1750 shown in FIGS. 17A and 17B, corresponding to a portion of the test plate, was provided with a uniform fixed volumetric heat generation term corresponding to the applied electric power. The blocks 1710-1750 were provided with thermophysical properties (e.g., density, specific heat, thermal conductivity) corresponding to those of aluminum.

Each surface of the blocks 1710-1750 were also provided with a coupled thermal boundary condition to model effects of natural convection. The coupled boundary condition can ensure that energy transported to the clamp and plate surfaces by conduction is equal to the heat transported away from the surfaces by natural convection and radiation. The radiation was modeled between surfaces, e.g., the surrounding medium (air) was considered not to absorb radiation.

The blocks 1710-1730, corresponding to the clamp structure, were assigned an emissivity value of 0.6. The emissivity of the emitter test plate (e.g., the blocks 1740-1750) was adjusted to provide the experimentally measured temperature corresponding to each set of simulation conditions.

Table 3 provides emissivity data obtained over a range of temperatures for both uncoated test plates and test plates coated with small particles. The power-temperature data corresponding to these data are shown in the graph of FIG. 15. The observed increase in emissivity for coated materials as compared to uncoated materials was generally about 0.22 (e.g., an increase of approximately 25%).

The computational results shown in Table 3 permit numerical estimation of emissivity enhancement provided by coatings of small particles. The emissivity of the clamp material in the simulations was varied from 0.6 to 0.3 to assess sensitivity of the calculated results to this estimated parameter. Changing the emissivity of the clamp led to a slight change in the calculated test plate emissivities, but the difference in emissivity between the coated and uncoated test plates were essentially unaffected. The emissivity of the emitter material when coated with small particles was observed to be approximately 22-25% greater than that of uncoated emitter material over the range of temperatures considered. For example, emissivity values greater than 0.8 and greater than 0.9 were determined for the coated test plates, whereas uncoated plates were determined to have an emissivity value not greater than about 0.7 over the range of temperatures investigated.

The enhanced or increased emissivity of emitter plate surfaces may be provided by a coating of small particles containing, e.g., oxygen, containing oxygen and nitrogen, or oxygen, nitrogen and carbon, and optionally containing a metalloid such as boron. Such particles may also contain, for example, oxygen, nitrogen and carbon, iron, silica (e.g., an oxide of silicon), silicon, carbon, chromium and/or aluminum.

TABLE 3

Emissivity values determined by matching numerical simulation results with experimentally measured temperatures.

| Temp (K) of coated emitter (measured) | Emissivity of coated emitter (calculated) | Power, Watts (measured) | Temp (K) of uncoated emitter (measured) | Emissivity of uncoated emitter (calculated) | Power, Watts (measured) |
|---|---|---|---|---|---|
| 290 | | 0 | 285 | | 0 |
| 365 | | 1.56 | 359 | | 1.56 |
| 470 | | 6 | 485 | | 6 |
| 586 | | 9.89 | 607 | | 9.89 |
| 646 | | 12.91 | 681 | | 12.91 |
| 728 | | 17.08 | 765 | | 17.08 |
| 800 | | 20.46 | 831 | | 20.46 |
| 866 | | 24.21 | 909 | | 24.21 |
| 932 | | 28.14 | 961 | | 28.14 |
| 977 | | 31.33 | 1006 | | 31.33 |
| 1014 | | 34.62 | 1047 | | 34.62 |
| 1036 | | 37.75 | 1082 | | 37.75 |
| 1063 | | 40.68 | 1118 | | 40.69 |
| 1097 | | 44.5 | 1147 | | 44.51 |
| 1126 | | 47.5 | 1173 | | 47.51 |
| 1153 | 0.78 | 50.79 | 1204 | 0.56 | 50.8 |
| 1174 | | 54.76 | 1232 | | 54.77 |
| 1205 | | 58.48 | 1258 | | 58.49 |
| 1238 | 0.82 | 64.5 | 1306 | 0.57 | 64.52 |
| 1256 | | 66.72 | 1313 | | 66.73 |
| 1265 | | 68.33 | 1323 | | 68.34 |
| 1273 | 0.87 | 69.08 | 1333 | 0.63 | 69.09 |
| 1288 | | 72.59 | 1348 | | 72.6 |
| 1298 | 0.95 | 75.05 | 1358 | 0.7 | 75.06 |
| 1323 | | 78.82 | 1368 | | 78.83 |

Figure 20:
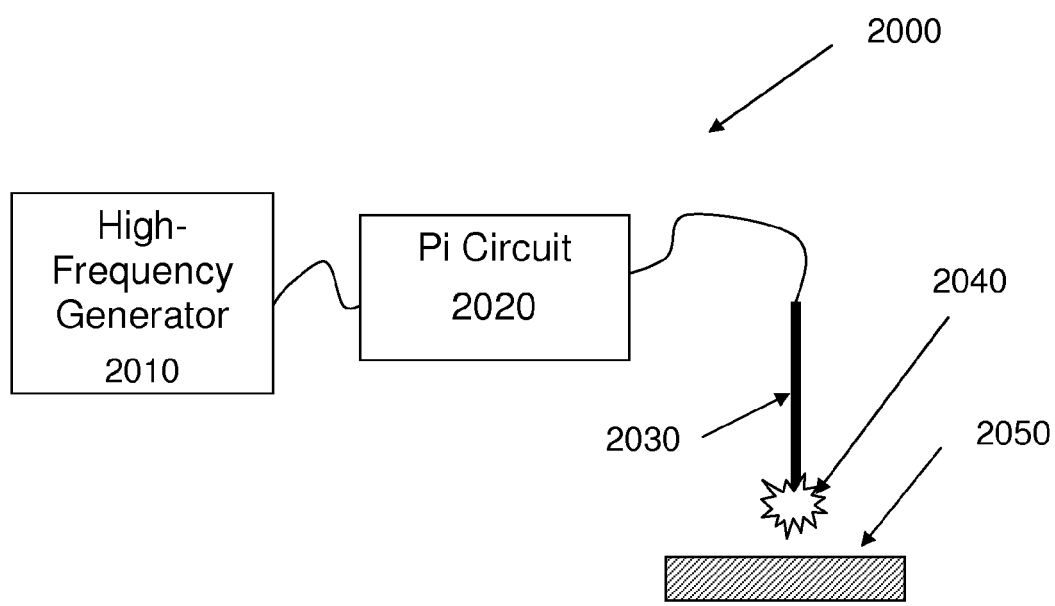
FIG. 20 is a schematic diagram of an exemplary apparatus which may be used with exemplary embodiments of the present invention.

Materials coated with small particles may be provided in accordance with certain exemplary embodiments of the present invention using an exemplary single-sided electrode apparatus 2000 shown in FIG. 20. The single-sided electrode may be capable of producing a continuous arc or discharge in the absence of a nearby electrically grounded object. Such apparatus is also described, e.g., in U.S. patent application Ser. No. 11/098,474. Techniques using a single-sided electrode apparatus can be distinguished, e.g., from explosive discharge techniques which may use high power settings or electrochemical techniques to deposit material.

The exemplary apparatus 2000 can include a high-frequency generator 2010, which may be electrically connected to a conventional Pi circuit 2020 or an equivalent circuit. The Pi circuit 2020 may optionally be provided in the same housing as the generator 2010. An electrode 2030 may be connected to the output of the Pi circuit 2020. Power provided by the generator 2010 can generate a high voltage potential and/or a discharge arc 2040 at a distal end of the electrode 2040. The arc 2040 can generate particles from the end of the electrode 2030. The arc 2040 may be provided in proximity to a surface 2050 to be coated with small particles, such that particles generated by the arc 2040 can impinge on the surface 2050 and may adhere thereto.

In certain exemplary embodiments of the present invention, the generator 2010 may be an approximately 14 MHz commercial generator, and it may be supplied with electricity from a 208-volt 3-phase source. The electrode 2030 can have a form of an electrically conductive or semiconductive rod or wire, and may be, e.g., approximately 0.5 mm in diameter. For example, the electrode 2030 may include $SiO_2$, $Si_3N_4$, SiC and/or $MoSi_2$, and can further include a silica coating. In one exemplary embodiment of the present invention, the electrode 2030 may be a sharpened or thinned molybdenum silicide rod which may be coated with a conductive mixture, e.g., of $SiO_2$, $Si_3N_4$ and/or SiC. Alternatively, the electrode 2030 may have a form of an electrically conductive rod coated with a mixture of $SiO_2$, $Si_3N_4$, SiC and/or $MoSi_2$.

Approximately 0.6 kW of power supplied by the generator 2010 to the electrode 2030 can generate a continuous arc 2040 at an end of the electrode. Interaction between the electrode 2030 and the arc 2040 can generate particles which may then impinge on a surface 2050. The surface 2050 may include, e.g., an iron-chromium-aluminum alloy, and it can be positioned in proximity to the arc 2040, e.g., at a distance of approximately 2 cm. Particles produced by the interaction between the arc and the electrode material using this exemplary procedure may have an appearance similar to the particles shown in FIG. 2. A size of particles formed using the arc 2040 may be less than about 1 µm, and such particles may have varied shapes. Several passes of the arc 2040 over the surface to be covered 2050 can be performed, where each pass may have a duration, e.g., of approximately two or three seconds over a region of the surface 2050. This exemplary technique may provide small particles which can be fused to the surface 2050 without being significantly sintered to each other. Deposition of such particles may be performed in air or, optionally, in other reactive or non-reactive gasses.

A surface 2050 to be coated in accordance with exemplary embodiments of the present invention may have greater than about 90% of its area covered by small particles, or preferably close to, e.g., 100% coverage. The small particles can be smaller than about 1 µm, and may have sizes, e.g., between about 0.01 and 1 µm, between about 0.01 and 0.8 µm, between about 0.01 and 0.5 µm, or between about 0.02 and 0.5 µm. The particles may include, e.g., Al, Fe, O, Cr, Si and/or C, which may be present in various compounds and/or phases. An energy dispersive x-ray analysis of average composition of exemplary particles formed in accordance with exemplary embodiments of the present invention is shown in FIG. 2C. This analysis indicates that the composition of exemplary particles formed as described herein may include up to about 5% carbon, up to about 15% Al, up to about 15% silicon, and about 50% oxygen. This compositional analysis is approximate, and other particle compositions may be formed in accordance with exemplary embodiments of the present invention.

Surfaces coated with small particles as described herein can include an increased surface area density, which can refer to a ratio of a total surface area of a surface to a cross-sectional area. For example, a smooth surface may have a surface area density of approximately one, whereas a roughened or textured surface (e.g., a surface coated with small particles) may have a surface area density, e.g., of about three or four.

Exemplary embodiments of the present invention may be used, for example, to accelerating drying of ink, varnish and/or water-based coatings in certain painting or coating processes. Thus, it may be possible to produce high quality graphics with in-line processing more efficiently.

Surfaces coated with small particles in accordance with exemplary embodiments of the present invention may exhibit other advantageous properties, and can be used in a variety of applications. For example, an evaporation rate of a film of water from a glass surface coated with small particles comprising, e.g., oxygen, silica (e.g., an oxide of silicon), silicon, carbon and/or nitrogen may be significantly lower than the evaporation rate from an uncoated glass surface. This shift in the evaporation rate may braise from surface energy effects associated with the coating of small particles. Such coatings may further provide and/or alter a variety of surface characteristics of films or substrates which may affect, for example, oxidation rates, oxide adherence, film adherence and/or surface wave propagation (e.g., absorption or emission) of electromagnetic and/or acoustic waves. Characteristics of outer electrons located at the surface may also be influenced by such particles to alter surface conductivity or resistivity.

Surfaces coated with the exemplary small particles as described herein may also be used, e.g., as substrates for surface chemical reactions or for sound attenuation because of their large specific surface areas. For example, such coated surfaces may be used for products such as battery electrodes or high temperature electrodes, or in molten metal electrolysis procedures. They may also be used in procedures where reactions such as electrolysis (e.g., metal extraction) are performed.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. In addition, any patent, patent application and/or other publication cited herein is incorporated herein in its entirety.

What is claimed is:

1. A structure, comprising: a substrate; and an outer coating applied to a surface of the substrate, wherein the outer coating consists of particles having a size of less than 1 µm, wherein at least one of the particles is fused to the surface of the substrate, wherein the particles are lightly sintered to each other, wherein at least one portion of the substrate is covered by the outer coating, wherein the outer coating also consists of substrate material intermixed with the particles and wherein the outer coating has a porous configuration that is resistant to densification at a temperature greater than half of an absolute melting temperature of a lowest melting point constituent in the substrate.

2. The structure according to claim 1, wherein the coating is formed by: producing an arc at an end of an electrode of a single-sided electrode arrangement; and providing the substrate in a proximity to the arc, wherein particles discharged from the arc are provided on the substrate and at least partially adhere thereto.

3. The structure according to claim 2, wherein the electrode comprises at least one of $SiO_2$, $Si_3N_4$, SiC or $MoSi_2$.

4. The structure according to claim 1, wherein the particles remain adherent to the substrate at a temperature greater than half of an absolute melting temperature of a lowest melting point constituent in the substrate.

5. The structure according to claim 1, wherein the structure has a surface area density that is greater than about 3.

6. The structure according to claim 1, wherein the structure has a creep resistance that is greater than the creep resistance of the substrate.

7. The structure according to claim 1, wherein the structure has an emissivity greater than about 0.7.

8. The structure according to claim 1, wherein a rate of growth of an oxide film on the coated section of the substrate is less than the rate of growth of the oxide film on an uncoated section of the substrate.

9. The structure according to claim 1, wherein an oxide film formed on the structure is more resistant to spalling than the oxide film formed on the substrate.

10. The structure according to claim 1, wherein the structure is configured to dry at least one of a sheet of paper, a web of paper, or a liquid film applied to an object.

11. The structure according to claim 1, wherein the structure has a form of at least a portion of at least one of a heating arrangement or a cooling arrangement.

12. The structure according to claim 1, wherein the structure is configured to at least one of dampen or at least partially absorb acoustical vibrations.

13. The structure according to claim 1, wherein the particles contain oxygen.

14. The structure according to claim 13, wherein the particles are further comprised of materials from the list consisting of nitrogen, carbon, boron, iron, silica, silicon, chromium, aluminum and a metalloid.

15. The structure according to claim 1, wherein the particles are the product of an arc generated from an end of an electrode.

16. The structure according to claim 1, wherein the particles are about 10 nanometers in diameter.

17. The structure according to claim 1, wherein the porous configuration is open.

\* \* \* \* \*